US008498790B2

(12) United States Patent
Fujiwara et al.

(10) Patent No.: US 8,498,790 B2
(45) Date of Patent: Jul. 30, 2013

(54) CONTROL DEVICE FOR AUTOMATIC TRANSMISSION

(75) Inventors: Michitaka Fujiwara, Kobe (JP); Tsuneo Tanabe, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 359 days.

(21) Appl. No.: 12/907,324

(22) Filed: Oct. 19, 2010

(65) Prior Publication Data

US 2011/0276240 A1    Nov. 10, 2011

(30) Foreign Application Priority Data

May 10, 2010 (JP) ................................. 2010-108205

(51) Int. Cl.
*F16H 61/02* (2006.01)
*F16H 59/38* (2006.01)

(52) U.S. Cl.
USPC ............................................ 701/59; 701/66

(58) Field of Classification Search
None
See application file for complete search history.

(56) References Cited

U.S. PATENT DOCUMENTS

| 6,390,947 B1 * | 5/2002 | Aoki et al. ........................ 477/3 |
| 6,716,138 B2 * | 4/2004 | Matsubara et al. ............ 477/167 |
| 6,913,558 B2 * | 7/2005 | Mori et al. ........................ 477/3 |
| 2003/0109970 A1 * | 6/2003 | Nakamori et al. .............. 701/22 |

FOREIGN PATENT DOCUMENTS

| JP | 2002-372135 A | 12/2002 |
| JP | 2003-262264 A | 9/2003 |
| JP | 2006-170399 A | 6/2006 |
| JP | 2006-189113 A | 7/2006 |

* cited by examiner

*Primary Examiner* — Michael J Zanelli
(74) *Attorney, Agent, or Firm* — Sughrue Mion, PLLC

(57) ABSTRACT

The driving output of the electric oil pump during an engine automatic stop is learnt by gradually increasing the driving output of the electric oil pump after an engine automatic stop and discriminating a state immediately before engagement on the basis of the behavior of an input shaft rotation number and a turbine rotation number. Thereby, the working oil pressure supplied by the electric oil pump during an engine automatic stop immediately after an engine automatic stop can be made suitable even if a vehicle is in a stopped state without adding an oil pressure sensor and an oil pressure switch, and a vain increase in power consumption, a deterioration of acceleration responsiveness at the time of an engine restart, generation of shock, or a soaring of the number of engine rotations can be prevented.

5 Claims, 13 Drawing Sheets

CONTROL DEVICE FOR AUTOMATIC TRANSMISSION

BACKGROUND OF THE INVENTION

1. Field of the Invention

The present invention relates to a control device for an automatic transmission including both a mechanical oil pump driven by an engine and an electric oil pump driven by an electric motor, and adapted so that working oil pressure is supplied to a transmission by performing switching to the electric oil pump from the mechanical oil pump at the time of an idle stop.

2. Description of the Background Art

Conventionally, there has been developed an engine control device adapted to stop an engine automatically when a predetermined engine automatic stop condition is satisfied at the time of traffic congestion or stopping the vehicle to wait for a signal for the purpose of saving the fuel which drives the engine, reduction of exhaust gas generated by combustion of the fuel, or the like, and thereafter to restart the engine automatically when a restart condition, such as a starting operation, is satisfied.

In such an engine control device, during an automatic stop of the engine, the mechanical oil pump driven by the engine stops. Therefore, the oil pressure for speed changing in a hydraulic control circuit included in the automatic transmission decreases, and a forward clutch will be disengaged with the hydraulic control circuit remaining at a first speed. As a result, next, when the engine has been automatically restarted, there is a problem in that the oil pressure which has abruptly risen due to the driving of the mechanical oil pump is supplied to the forward clutch as the oil pressure for engagement without being controlled, and an engagement shock is generated.

Thus, there is known a technique including an electric oil pump driven by an electric motor separately from the above mechanical oil pump driven by the engine, driving this electric oil pump during the automatic stop of the engine, thereby generating working oil pressure, and supplying this working oil pressure to a forward clutch as oil pressure for engagement, thereby maintaining a forward clutch in an engagement state where torque can be transmitted or in a state immediately before engagement.

Generally, in a case where the electric oil pump is mounted, in order to supply working oil pressure to the automatic transmission during an engine automatic stop, the electric oil pump is driven, and the power consumption of an electric storage device, such as a battery, increases. Moreover, as mentioned above, the case where the electric oil pump is driven is during an engine automatic stop. Therefore, the power generation by a power generator is also stopped, and the electric storage device is not supplied with electric power, but just consumes electric power.

That is, in order to maintain the forward clutch during an engine automatic stop in an engagement state or in a state immediately before engagement, it is desired to drive the electric oil pump so as to generate the minimum required working oil pressure, thereby suppressing the power consumption from the electric storage device as much as possible. That is, when the working oil pressure generated by the electric oil pump generates the working oil pressure which is higher than a pressure required to maintain the forward clutch in an engagement state or in a state immediately before engagement at the time of an engine automatic stop, the electric power of the electric storage device is consumed in vain. On the other hand, when the working oil pressure becomes a working oil pressure which is lower than the required working oil pressure, the forward clutch is slightly opened, and the forward clutch engages suddenly at the time of an engine restart. As a result, it becomes impossible to avoid problems, such as the generation of shock, the soaring of the number of engine rotations, or the deterioration of durability caused by a slip of the clutch.

In order to avoid these problems and to drive the electric oil pump so as to generate a minimum working oil pressure capable of maintaining the forward clutch in an engagement state or in a state immediately before engagement, it is considered that a control is performed by the feedback control of changing the driving output (driving voltage, driving duty, or the like) of the electric oil pump so that the working oil pressure comes to be within a target working oil pressure while the working oil pressure which is actually generated is detected, or that the driving output of the electric oil pump which becomes a preset target working oil pressure is obtained in advance by an experiment or the like, and the open control of driving the electric pump by the output which has been obtained in advance is performed.

Here, for example, Japanese Patent No. 3842150 suggests, in order to perform the feedback control, a technique of controlling driving of the electric oil pump not according to an automatic stop command of the engine but according to the detection value of an oil pressure sensor which detects the line pressure in the hydraulic control circuit, thereby driving or stopping the electric oil pump with suitable timing to suppress power consumption and guarantee start responsiveness.

However, in the method suggested in Japanese Patent No. 3842150, it is necessary to provide an expensive oil pressure sensor for measuring the actual oil pressure in the hydraulic control circuit for supplying the oil pressure for engagement to the forward clutch and the control operation also becomes complicated. Therefore, a cost increase will be caused in terms of both hardware and software.

On the other hand, in the case of the open control, the problem of such a cost increase does not exist. However the amount of driving of the electric oil pump for generating the target working oil pressure, i.e., the working oil pressure maintaining the forward clutch in an engagement state or in a state immediately before engagement, should be accurately obtained in advance. However, since the degree of leakage of the working oil in a valve body which constitutes the hydraulic control circuit changes individually depending on individual differences, temporal change, or the like regarding the valve body, the driving output of the electric oil pump which becomes the target working oil pressure is not uniformly determined. As a result, even if the electric oil pump is driven with the same driving output, there is a problem in that oil pressure higher than needed is generated at a certain time, and electric power is consumed in vain, or oil pressure lower than a target oil pressure is generated at a certain time, and an engagement shock or soaring occurs.

For this reason, JP-A-2006-170399 suggests the technique of measuring the driving output of the electric oil pump and the characteristics of oil pressure, not using an oil pressure sensor but using a less expensive oil pressure switch, and obtaining the driving output of the electric oil pump, thereby suppressing power consumption and guaranteeing start responsiveness. However, even in the method suggested in JP-A-2006-170399, it is necessary to provide the oil pressure switch for measuring the oil pressure characteristics, and a cost increase is caused.

Additionally, a technique of controlling the supply of oil pressure to the forward clutch according to a target number of turbine rotations without using an additional sensor, thereby maintaining the forward clutch in a state immediately before engagement is suggested in JP-A-2006-189113.

JP-A-2006-189113 is intended for a hybrid vehicle including an electric motor or the like separately from an engine, and capable of traveling even during an engine stop. In the suggested technique, the vehicle travels through a driving force other than the engine, such as an electric motor, even during an engine stop, and thereby a transmission is driven. At this time, it becomes possible to control the supply of oil pressure to the forward clutch, thereby controlling the number of turbine rotations to be a target number of rotations. That is, it is required that the vehicle is able to start and travel using other driving forces even during an engine stop. For this reason, in an idle stop vehicle in which the only source of driving force for making the vehicle travel is the engine, and which cannot travel without an engine restart when the engine stops, there is a problem in that the technique suggested in JP-A-2006-189113 cannot be executed.

SUMMARY OF THE INVENTION

The invention has been made in order to solve the above problems, and suggests a control device which reliably maintains a forward clutch in a state immediately before engagement during an engine automatic stop with the minimum required power consumption irrespective of individual differences and temporal change in an automatic transmission without causing a cost increase by addition of an oil pressure sensor or an oil pressure switch in an idle stop vehicle adapted so that the engine stops automatically.

A control device for an automatic transmission related to a first aspect of the present invention is a control device for an automatic transmission having an automatic transmission which receives working oil pressure to perform transmission operation, including a mechanical oil pump driven by an engine to supply the working oil pressure for transmission operation control to the automatic transmission, and an electric oil pump driven by an electric motor to supply the working oil pressure for transmission operation control to the automatic transmission, in which the working oil pressure generated by the electric oil pump is supplied to the automatic transmission when the engine has automatically stopped after a vehicle stop. The control device further includes learning means for learning the driving output of the electric oil pump where the forward clutch is brought into a state immediately before engagement by gradually increasing the output of the electric oil pump after an engine automatic stop when the working oil pressure generated by the electric oil pump is supplied to a forward clutch engaged at a shift stage at the time of a vehicle stop, and discriminating the engagement state of the forward clutch on the basis of the behavior of the number of turbine rotations of the automatic transmission.

A control device for an automatic transmission related to a second aspect of the present invention is a control device for an automatic transmission having an automatic transmission which receives working oil pressure to perform transmission operation, including a mechanical oil pump driven by an engine to supply the working oil pressure for transmission operation control to the automatic transmission, and an electric oil pump driven by an electric motor to supply the working oil pressure for transmission operation control to the automatic transmission, in which the working oil pressure generated by the electric oil pump is supplied to the automatic transmission when the engine has automatically stopped before a vehicle stop. The control device further includes learning means for learning the driving output of the electric oil pump where the forward clutch is brought into a state immediately before engagement by gradually increasing the output of the electric oil pump after an engine automatic stop when the working oil pressure generated by the electric oil pump is supplied to a forward clutch engaged at a shift stage at the time of a vehicle stop, and discriminating the engagement state of the forward clutch on the basis of the behavior of the number of turbine rotations of the automatic transmission and the input shaft rotation number of the automatic transmission.

According to the control device for the automatic transmission related to the present invention, in a case where an engine automatic stop condition is satisfied, it is possible to execute the control of automatically stopping the engine, and detect the oil pressure to be supplied to the hydraulic control circuit connected to the forward clutch of the automatic transmission by the electric oil pump, using the driving output of the electric oil pump where the forward clutch is brought into a state immediately before engagement, and it is possible to reliably maintain the forward clutch in a state immediately before engagement with the minimum required power consumption during an engine automatic stop irrespective of individual differences and temporal change in an automatic transmission. For this reason, there are advantages in that power consumption can be prevented from increasing in vain as the oil pressure supplied by the electric oil pump becomes a pressure that is higher than needed, and it is possible to prevent deterioration of acceleration responsiveness at the time of an engine restart, generation of a shock, and soaring of the engine rotation number, which are caused as the pressure to be supplied becomes a pressure that is lower than needed.

The foregoing and other objects, features, aspects, and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
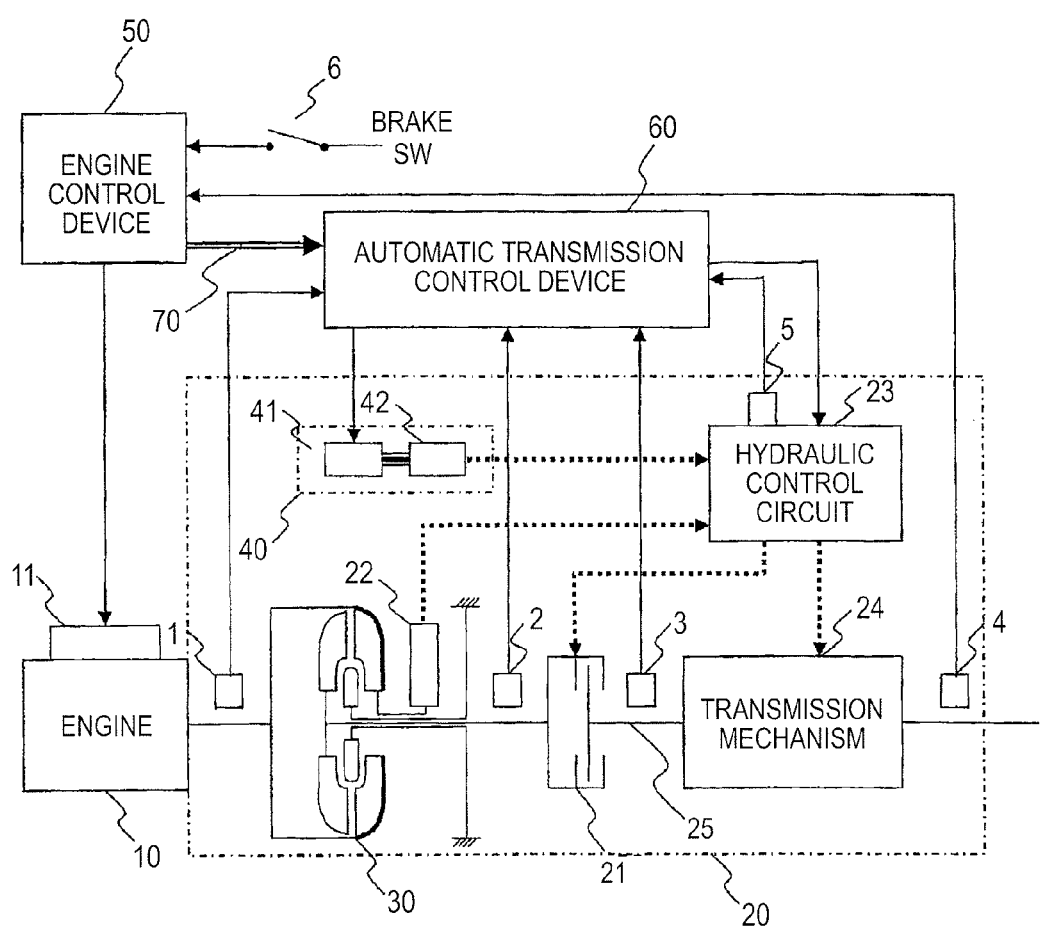
FIG. 1 is a view showing a schematic configuration of a control device for an automatic transmission related to first embodiment of the present invention.
Figure 2:
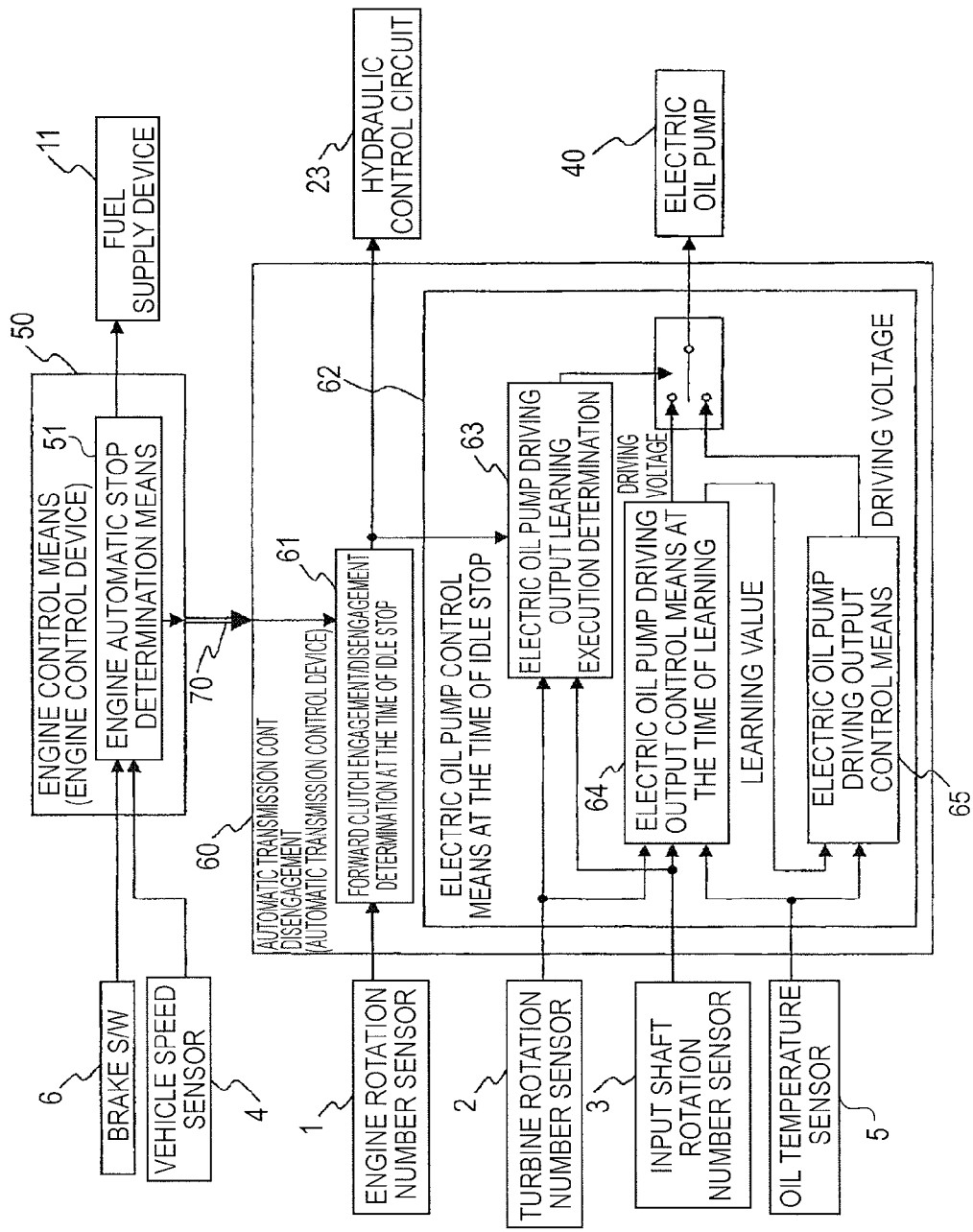
FIG. 2 is a block diagram of the control device for the automatic transmission related to first embodiment of the present invention.

Hereinafter, first embodiment of the present invention will be described with reference to the drawings. FIG. 1 is a view showing a schematic configuration of a control device for an automatic transmission in first embodiment of the present invention, and FIG. 2 is a block diagram of the control device for the automatic transmission in first embodiment of the present invention.

In FIG. 1, the control device for the automatic transmission related to first embodiment includes an engine 10, an automatic transmission 20, an engine control device 50, and an automatic transmission control device 60. A fuel supply device 11 is included in the engine 10 to supply fuel to the engine 10. A brake switch 6 is connected to the engine control device 50.

The output rotation of the engine 10 is input to a transmission mechanism 24 via a forward clutch 21 and input shaft 25 which are provided in the automatic transmission 20 via a torque converter 30. A mechanical oil pump 22 which rotates along with the engine 10 is provided in the automatic transmission 20 to supply oil pressure to a hydraulic control circuit 23. The hydraulic control circuit 23 is supplied with oil pressure from the mechanical oil pump 22, and is also supplied with oil pressure from the electric oil pump 40. The electric oil pump 40 is composed of an electric motor 41 for pump driving, and a pump 42, and supplies oil pressure to the hydraulic control circuit 23.

A signal of a vehicle speed detecting sensor 4 and a signal from the brake switch 6 are input to the engine control device 50, thereby controlling the operation of the fuel supply device 11. Individual signals are input to the automatic transmission control device 60 from an engine rotation number detecting sensor 1, a turbine rotation number detecting sensor 2, an input shaft rotation number detecting sensor 3, and an oil temperature sensor 5, thereby controlling the automatic transmission 20.

Next, the idle stop execution and the driving output learning control of the electric oil pump will be described with reference to FIG. 2. An engine control device (engine control means) 50 of a vehicle is provided with an engine automatic stop determination means 51 which realizes an engine automatic stop function. The engine automatic stop determination means 51 determines that an idle stop execution condition has been satisfied, for example, in a case where the brake switch operates, the vehicle is in a stopped state, and engine water temperature is equal to or greater than a threshold value. At this time, in order to stop the engine, the engine control device 50 controls the fuel supply device 11, thereby stopping the supply of fuel to the above-mentioned engine 10. Additionally, in a case where the above-mentioned idle stop execution condition is not satisfied during an engine automatic stop, the engine control device 50 restarts the above-mentioned engine 10.

The above idle stop execution condition is transmitted to the automatic transmission control device (automatic transmission control means) 60 via a communication channel 70. When the automatic transmission control device 60 receives a signal of satisfaction of the idle stop execution condition via the communication channel 70, a signal is sent to the hydraulic control circuit 23 by a forward clutch engagement/disengagement determination means 61 at the time of an idle stop so that the above-mentioned forward clutch 21 which transmits an engine driving force to an axle is disengaged. The hydraulic control circuit 23 is provided with a hydraulic solenoid (not shown) which controls the supply of oil pressure to the forward clutch 21, or controls the transmission mechanism 24 or the like, and the hydraulic solenoid is controlled by the automatic transmission control device 60.

When it is determined that working oil pressure is no longer generated as the engine 10 stops, and the mechanical oil pump 22 connected to the output shaft of the engine 10 stops rotating, the forward clutch engagement/disengagement determination means 61 at the time of an idle stop is controlled so that a predetermined working oil pressure is supplied to the hydraulic control circuit 23 by the electric oil pump 40. If the predetermined working oil pressure is supplied, the engagement of the forward clutch 21 becomes possible.

Figure 3:
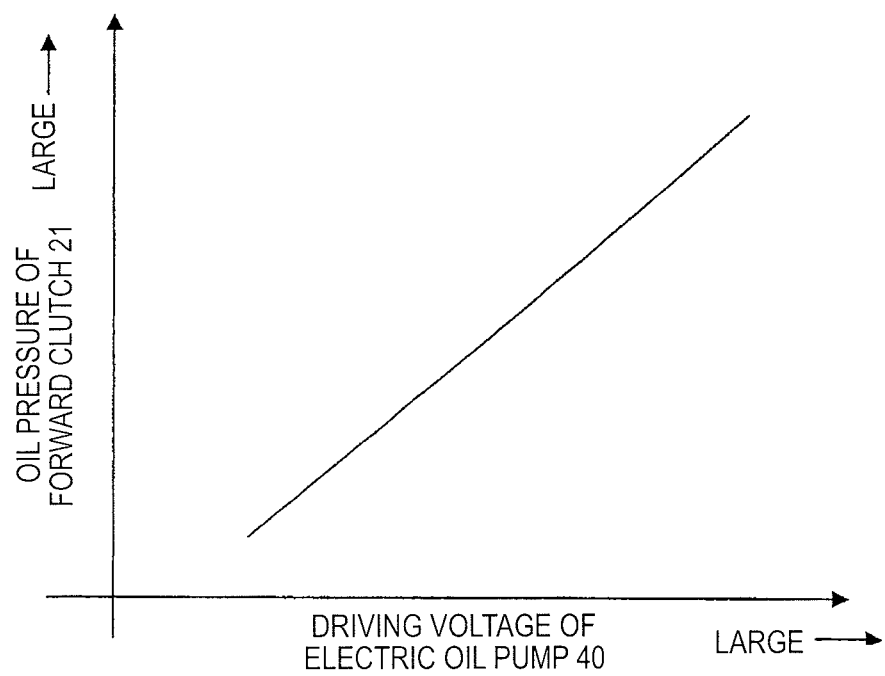
FIG. 3 is a view showing the relationship between electric oil pump driving output and the working oil pressure of a forward clutch when the working oil pressure of a supply path is supplied only to the forward clutch, in the control device for the automatic transmission related to first embodiment of the present invention.

An electric oil pump control means 62 at the time of an idle stop provided within the automatic transmission control device 60 performs the learning of the electric oil pump driving output, and control of the electric oil pump 40 at the time of an idle stop by an electric oil pump driving output learning execution determination means 63. The working oil pressure of the electric oil pump 40 changes according to a driving voltage. The working oil pressure is supplied to the above-mentioned forward clutch 21 via the hydraulic control circuit 23. At this time, in a case where the hydraulic control circuit 23 is controlled so as to supply the working oil pressure only to the forward clutch 21 as mentioned above, the driving voltage to the electric oil pump 40 and the working oil pressure supplied to the forward clutch 21 have the relationship as shown in FIG. 3.

When the electric oil pump driving output learning execution determination means 63 determines that the electric oil pump driving output learning has been executed, the driving output of an electric oil pump driving output control means 64 at the time of learning is selected, and the working oil pressure is supplied to the hydraulic control circuit 23 by the electric oil pump 40. Here, the electric oil pump driving output control means 64 at the time of learning performs a control so that the forward clutch 21 is brought into a state immediately before engagement by the driving output to the electric oil pump 40, and learns the electric oil pump driving output. The electric oil pump driving output control means 64 at the time of learning determines the engagement of the forward clutch 21 from a turbine rotation number Nt measured using the turbine rotation number sensor 2, and an input shaft rotation number Nis measured using the input shaft rotation number sensor 3, and records a learnt value. After completion of the electric oil pump driving output learning, the driving output of the electric oil pump driving output control means 65 is selected by the electric oil pump driving output learning execution determination means 63, and the electric oil pump 40 is driven using the above-mentioned learnt value (result).

When the automatic transmission control device 60 receives an idle stop execution condition failure via the communication channel 70, the automatic transmission control device executes transmission control at the time of engine starting, switches the driving output to the electric oil pump 40 to a higher driving output, and sets the working oil pressure to be supplied to the hydraulic control circuit 23 to a high pressure, thereby increasing the engagement force of the forward clutch. Then, in a case where the number of engine rotations becomes, for example, equal to or greater than a predetermined number of rotations, for example, 450 rpm, the driving of the electric oil pump 40 is stopped.

Figure 4:
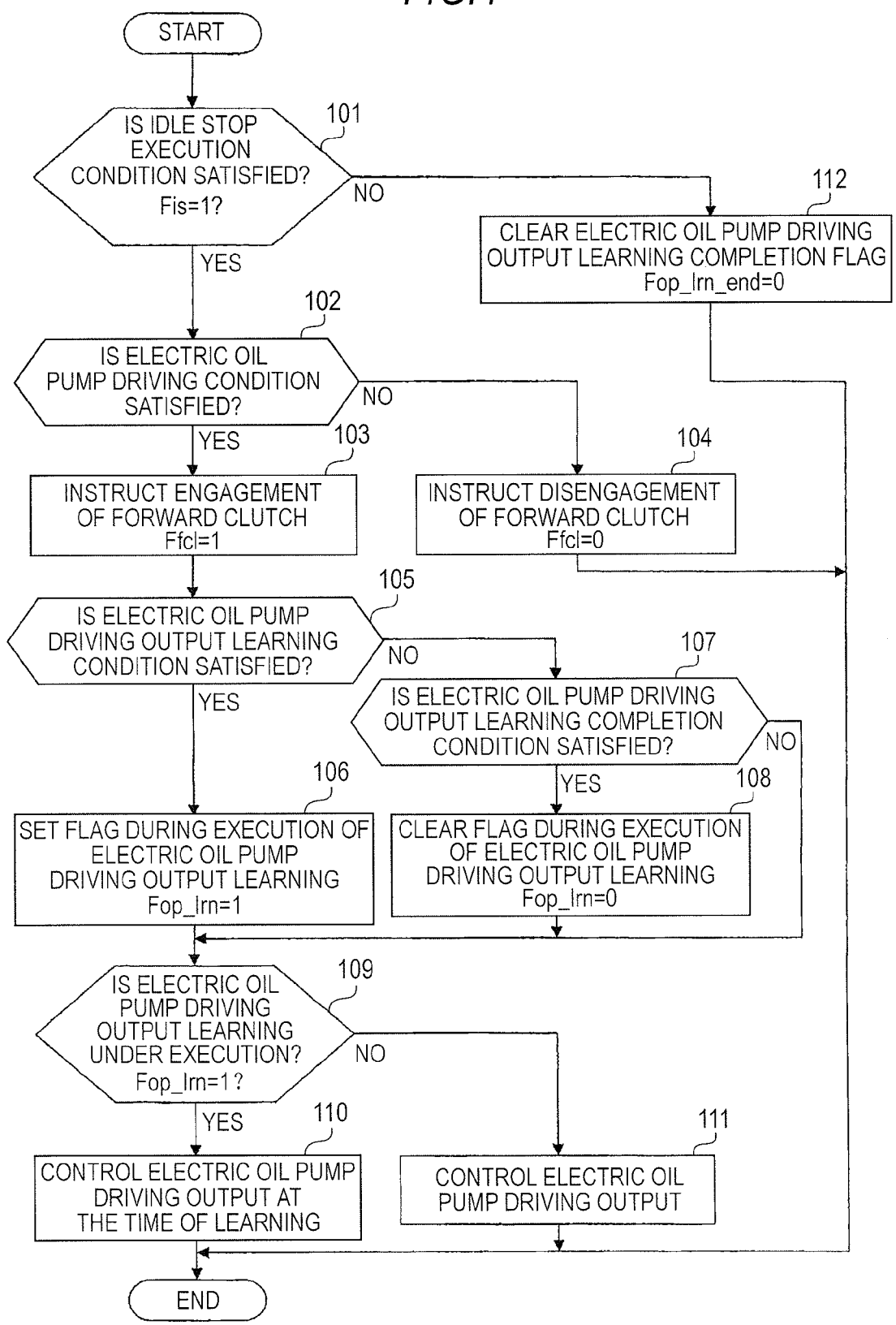
FIG. 4 is a flow chart showing a control operation of the electric oil pump driving output during idle stop execution, in the control device for the automatic transmission related to first embodiment of the present invention.

Next, forward clutch engagement/disengagement determination means 61 at the time of an idle stop to be executed by the automatic transmission control device 60, and the control operation of the electric oil pump control means 62 at the time of an idle stop are shown in the flow chart of FIG. 4. The electric oil pump driving output control means 64 at the time of learning referred to by FIG. 4, and the control operation of a recording method of a learnt value referred to by the electric oil pump driving output control means 64 at the time of learning are shown in flow charts of FIGS. 5 and 6, and the control operation of an electric oil pump driving output control means 65 referred to by FIG. 4 is shown in a flowchart of FIG. 7. This embodiment 1 is repeatedly executed by constant cycle processing (every several tens of milliseconds).

Figure 8:
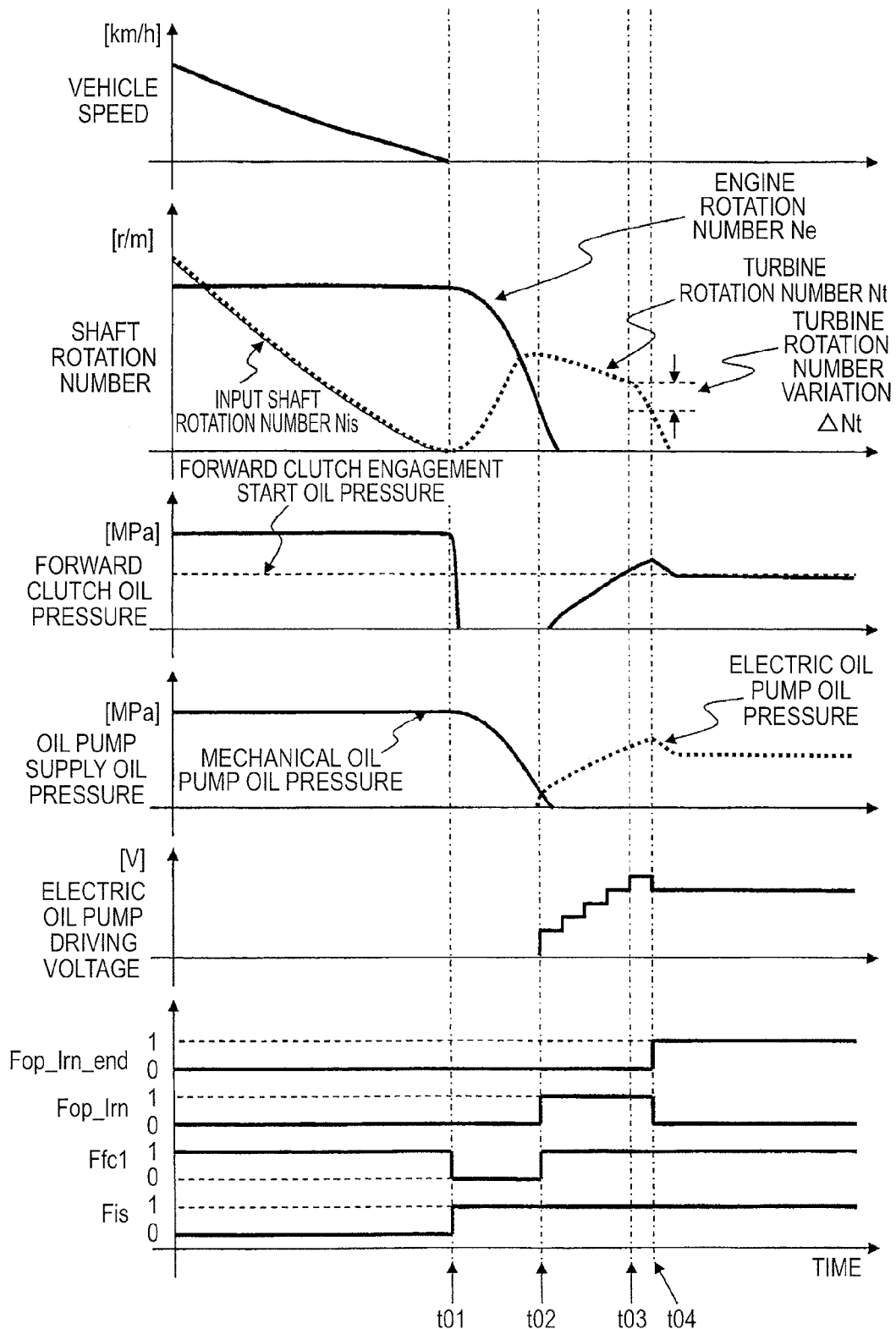
FIG. 8 is a time chart showing the relationship between the number of rotations of each rotary shaft, working oil pressure, and control flags when an electric oil pump driving output learning control has been executed, in the control device for the automatic transmission related to first embodiment of the present invention.

FIG. 8 is a time chart showing the relationship between the number of rotations of each rotary shaft, working oil pressure, and control flags when an electric oil pump driving output learning control has been executed, in first embodiment.

Hereinafter, the processing operation of the electric oil pump control means 62 at the time of an idle stop including the forward clutch engagement disengagement determination means 61 at the time of an idle stop, the electric oil pump driving output learning determination means 63, the electric oil pump driving output control means 64 at the time of learning, and the electric oil pump driving output control means 65 in first embodiment will be described with reference to FIGS. 4 to 8.

First, the processing operation of the forward clutch engagement disengagement determination means 61 at the time of an idle stop and the electric oil pump control means 62 at the time of an idle stop will be described using FIG. 4. In the drawing, Y represents Yes, and N represents No.

The automatic transmission control device 60 which is a control means first determines in Step 101 whether or not the idle stop execution condition transmitted from the engine control device 50 by the communication channel 70 is satisfied. In a case (to t01 of FIG. 8) where the idle stop execution condition is satisfied (Fis=1), the processing proceeds to Step 102. In the case (to t01 of FIG. 8) of failure (Fis=0), the processing proceeds to Step 112, an electric oil pump driving output learning completion flag is cleared (Fop_lrn_end=0), this control is ended, and subsequently, the idle stop execution condition is monitored. Here, an idle stop execution condition is satisfied, for example, in a case where the brake switch is operated by the engine control device 50, the vehicle is in a stopped state, and engine water temperature is equal to or greater than a threshold value, and in a case where an accelerator operation amount is equal to or smaller than a predetermined value, and the signal thereof is transmitted to the automatic transmission control device 60 via the communication channel 70.

An electric oil pump driving condition is determined in Step 102. In a case (t02 of FIG. 8) where the electric oil pump driving condition is satisfied, it is determined that the working oil pressure generated by the mechanical oil pump has decreased, and the processing proceeds to Step 103. Here, the electric oil pump driving condition is, for example, a case where, as the number of engine rotations decreases after the idle stop execution condition is satisfied, the number of engine rotations at which is determined that the working oil pressure generated by the mechanical oil pump 22 connected to the output shaft decreases has become 100 rpm or less.

In Step 103, in order to instruct the forward clutch 21 about engagement, a forward clutch engagement instruction flag is raised (Ffc1=1). Thereby, the hydraulic control circuit 23 is controlled so that the forward clutch 21 engages, and the processing proceeds to Step 105.

In a case (t01 to t02 of FIG. 8) where the electric oil pump driving condition is not satisfied, it is determined that the working oil pressure generated by the mechanical oil pump 22 is a high pressure, and the processing proceeds to Step 104. In Step 104, in order to instruct the forward clutch 21 regarding disengagement, the forward clutch engagement instruction flag is cleared (Ffc1=0). Thereby, the hydraulic control circuit 23 is controlled so that the forward clutch 21 disengages, and this control is ended.

In Step 105, an electric oil pump driving output learning condition is determined. In a case where the electric oil pump driving output learning condition is satisfied (t02 of FIG. 8), the processing proceeds to Step 106. In a case where the above condition is not satisfied, the processing proceeds to Step 107. Here, the electric oil pump driving output learning condition is a case where an electric oil pump driving output learning completion flag satisfies Fop_lrn_end=0, i.e., learning is not completed, and the turbine rotation number Nt measured by the turbine rotation number sensor 2 is equal to or greater than a predetermined value, for example, 200 rpm, and it is determined that this learning control can be executed.

In Step 106, in order to execute the electric oil pump driving output learning, an electric oil pump driving output learning flag is raised (Fop_lrn=1), and the processing proceeds to Step 109.

In Step 107, an electric oil pump driving output learning end condition is determined. In a case where the electric oil pump driving output learning end condition is satisfied (from t04 of FIG. 8), the processing proceeds to Step 108. In a case where the above condition is not satisfied, the processing proceeds to Step 109. Here, the electric oil pump driving output learning end condition is a case where an electric oil pump driving output learning completion flag satisfies Fop_lrn_end=1, i.e., learning has been completed, or a case where the turbine rotation number Nt measured by the turbine rotation number sensor 2 is smaller than a predetermined value, for example, 50 rpm, and it is determined that this learning control cannot be executed.

In Step 108, in order to end the electric oil pump driving output learning, the electric oil pump driving output learning flag is cleared (Fop_lrn=0), and the processing proceeds to Step 109.

In Step 109, it is determined whether or not the electric oil pump driving output learning is being executed. Since the electric oil pump driving output learning is being executed in the case that the electric oil pump driving output learning flag Fop_lrn=1 (from t02 of FIG. 8), the processing proceeds to Step 110. Since electric oil pump driving output learning is not being executed in a case where the above condition is not satisfied (from t04 of FIG. 8), the processing proceeds to Step 111.

In Step 110, in a case where the electric oil pump driving output learning is being executed (Fop_lrn=1), the electric oil pump driving output control at the time of learning is executed, and this control is ended. The electric oil pump driving output learning at the time of learning is executed using the electric oil pump driving output control means 64 at the time of learning.

In Step 111, in a case where the electric oil pump driving output learning is not being executed, the electric oil pump driving output control is executed, and this control is ended. The electric oil pump driving output is executed using the electric oil pump driving output control means 65.

Figure 5:
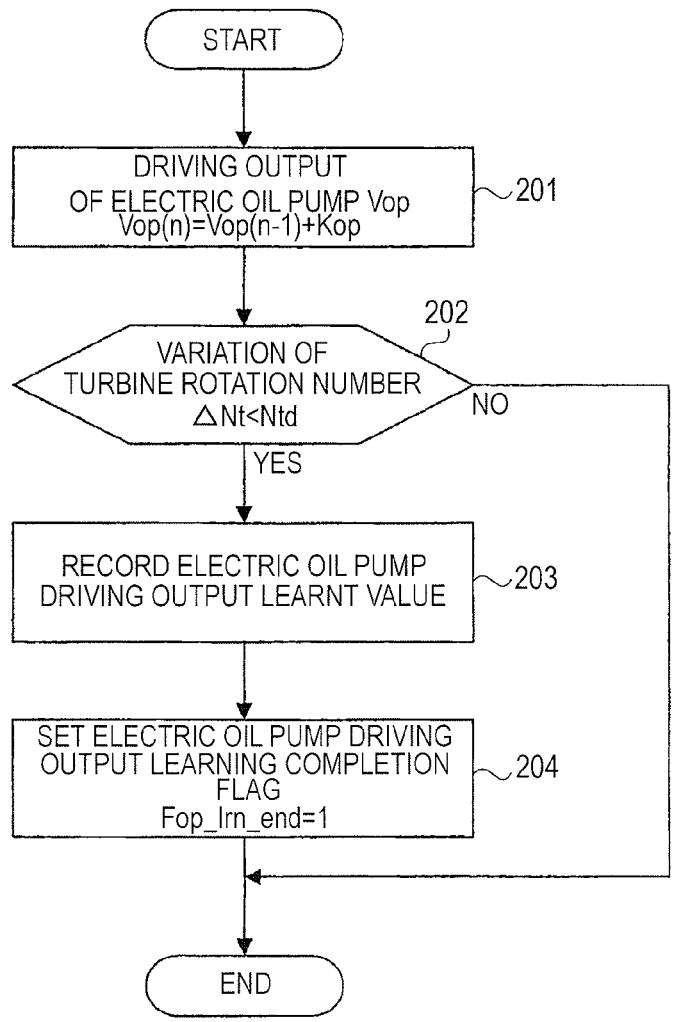
FIG. 5 is a flow chart showing a control operation for executing a learning control of the electric oil pump driving output, in the control device for the automatic transmission related to first embodiment of the present invention.

Next, the processing operation of the electric oil pump driving output control means 64 at the time of learning will be described with reference to FIG. 5.

The automatic transmission control device 60 which is a control means first obtains, in Step 201, a driving voltage Vop which is the driving output of the electric oil pump 40. The driving voltage Vop is calculated using the following expressions.

$$Vop(n)=Vop(n-1)+Kvop\ (n\ \text{represents this time and } n-1 \text{ represents a previous time})$$

Here, the constant Kvop to be added to the previous driving voltage Vop (n−1) is, for example, 0.5 V. In addition, first, in a case where learning of the initial value of the previous driving voltage Vop (n−1) is not executed once, a voltage, for example, 2.5 V, at which the working oil pressure is generated in advance by the driving of the electric oil pump may be used. Additionally, in a case where learning has been executed at least once in the past, in order to shorten learning time, a value may be used which is obtained by subtracting a predetermined value, for example, 2.0 V from a driving voltage Vop_is at the time of an engine automatic stop during idle stop execution obtained by the electric oil pump driving output learning which was previously executed.

Variation ΔNt of the number of turbine rotations is confirmed in Step 202. The variation ΔNt of the number of turbine rotations is obtained as follows.

$$\Delta Nt=Nt(n)-Nt(n-1)$$

Here, Nt(n) represents a value measured by the turbine rotation number sensor 2, and Nt (n−1) represents the previous measurement value of Nt(n). In a case where the variation ΔNt of the number of turbine rotations is smaller than the turbine variation determination value Ntd (t04 of FIG. 8), it is considered that the condition is satisfied, and the processing proceeds to Step 203. In a case where the condition is not satisfied (t02 to t03 of FIG. 8), this control is ended, and subsequently, monitoring is continued. Here, the turbine variation determination value Ndt is the data obtained by an experiment in advance as the amount of reduction which can be determined when the number of turbine rotations decreases in the direction in which the number of turbine rotations stops clearly as the forward clutch starts engagement, with respect to the amount of reduction when the forward clutch is disengaged after idle stop execution and the number of turbine rotations decreases in the state of an engine automatic stop, and is set to, for example, −50 rpm.

In Step 203, an electric oil pump driving output learnt value is recorded, and the processing proceeds to Step 204. The processing operation of a recording method of the electric oil pump driving output learnt value will be described later.

In Step 204, the electric oil pump driving output learning completion flag is set to Fop_lrn_end=1, and this control is ended. The electric oil pump driving output learning completion flag Fop_lrn_end=1 is cleared at the time of cancellation of an idle stop condition, i.e., at the time of an engine restart (Step 112 of FIG. 4).

Figure 6:
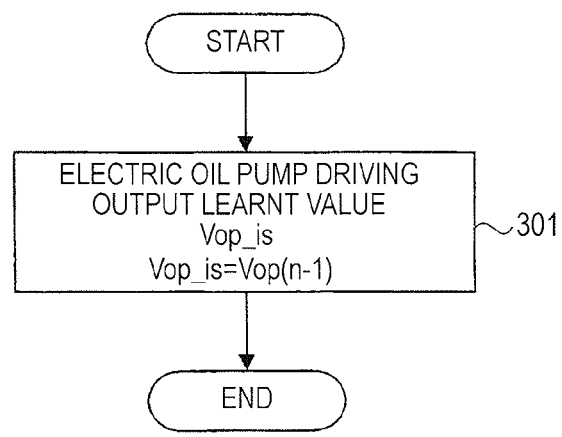
FIG. 6 is a flow chart showing the control operation for executing learning control value recording of the electric oil pump driving output, in the control device for the automatic transmission related to first embodiment of the present invention.

Next, the processing operation of the recording method of the electric oil pump driving output learnt value will be described with reference to FIG. 6.

The automatic transmission control device 60 which is a control means records the driving voltage Vop(n−1) as the electric oil pump driving output learnt value Vop_is in Step 301.

$$Vop\_is=Vop(n-1)$$

Figure 7:
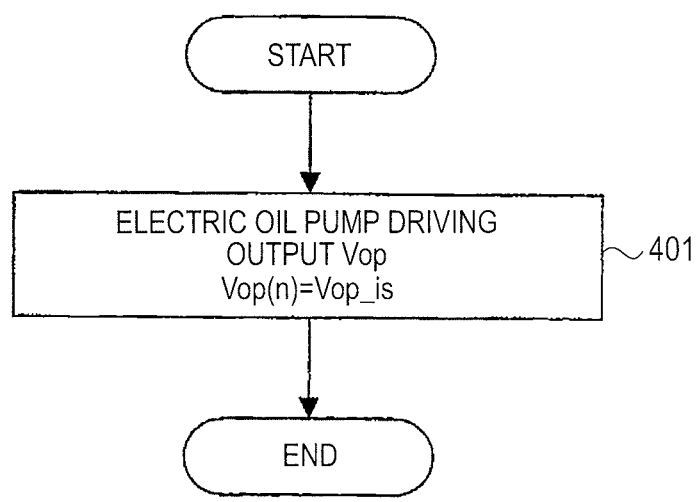
FIG. 7 is a flow chart showing the control operation for executing an electric oil pump driving output control while a learning control is not executed, in the control device for the automatic transmission related to first embodiment of the present invention.

Next, the processing operation of the electric oil pump driving output control means 65 will be described with reference to FIG. 7.

The automatic transmission control device 60 which is a control means outputs the electric oil pump driving output learnt value Vop_is as the driving voltage Vop in Step 401. Here, in a case where the electric oil pump driving output learning is not completed, i.e., the electric oil pump driving learning completion flag satisfies Fop_lrn_end=0, the driving voltage Vop uses the electric oil pump driving output learnt value Vop_is which has been previously learnt. Here, in preparation for a case where learning has not been executed once, an initial value calculated in advance by an actual car test is recorded in the electric oil pump driving output learnt value Vop_is.

Next, the operation of the control device for the automatic transmission related to first embodiment will be described with reference to a timing chart of FIG. 8. First, signals described on the time chart of FIG. 8 will be described. The graph of the vehicle speed shows the travel speed of a vehicle measured by the speed sensor 4. The graph of the shaft rotation number shows an engine rotation number Ne measured by the engine rotation number sensor 1, a turbine rotation number Nt measured by the turbine rotation number sensor 2, and an input shaft rotation number Nis measured by the input shaft rotation number sensor 3. The graph of the forward clutch oil pressure shows the working oil pressure supplied to the forward clutch 21, and the oil pressure required in order for the forward clutch 21 to start engagement. The graph of the oil pump supply oil pressure shows the working oil pressure supplied by the mechanical oil pump 22, and the working oil pressure supplied by the electric oil pump 40. The graph of the electric oil pump driving voltage shows a driving voltage instructed to the electric oil pump 40 by the automatic transmission control device 60. The graphs of the respective control flags show the movements of the electric oil pump driving output learning completion flag Fop_lrn_end, the flag Fop_lrn during electric oil pump driving output learning, the forward clutch engagement instruction flag Ffcl, and the idle stop execution condition flag Fis from the top.

The time chart of FIG. 8 will be described over time. When the vehicle speed decreases, and stops (t01), the idle stop execution condition is satisfied (Fis=0→1). At this time, the forward clutch oil pressure is reduced by controlling the hydraulic control circuit 23 so as to open the forward clutch (Ffcl=1→0). Next, when the engine rotation number Ne decreases (t02) as the fuel supply to the engine is stopped by idle stop execution, the supply of oil pressure by the mechanical oil pump 22 decreases. Therefore, the hydraulic control circuit 23 is controlled so that the forward clutch 21 engages (Ffcl=0→1). Additionally, the electric oil pump driving output learning control is started (Fop_lrn=0→1). When the supply of oil pressure is gradually increased by the electric oil pump driving output learning control, as the forward clutch oil pressure reaches the forward clutch engagement start oil pressure, and the forward clutch 21 engages, the turbine rotation number Nt changes in the direction in which the rotation number stops (t03). The start of the engagement of the forward clutch 21 is determined depending on the rotation number variation ΔNt at this time, the last electric oil pump driving voltage is held as a learnt value, and the electric oil pump driving output learning control is ended (Fop_lrn=1→0). After the electric oil pump driving output learning-control completion (Fop_lrn_end=0→1) (from t04), the learnt value is designated as the electric oil pump driving voltage until the idle stop execution condition is cancelled (Fis=1→0).

As described above, according to the control device for the automatic transmission related to first embodiment of the present invention, in an idle stop vehicle which automatically stops an engine after a vehicle stop, the forward clutch is made to generate working oil pressure and start engagement by gradually increasing the driving output of an electric oil pump unit after an engine automatic stop. Thereby, it becomes possible to detect changing so as to synchronize with the number of input shaft rotations at which the number of turbine rotations has stopped clearly, thereby determining the state immediately before engagement. Thereby, by learning the driving output of the electric oil pump during an engine automatic stop, the working oil pressure supplied by the electric oil pump during an engine automatic stop immediately after an engine automatic stop can be made suitable even if a vehicle is in a stopped state without adding an oil pressure sensor and an oil pressure switch, and a vain increase in power consumption, deterioration of acceleration responsiveness at the time of an engine restart, generation of shock, and soaring of the number of engine rotations can be prevented.

Second Embodiment

In second embodiment, differently from first embodiment, an idle stop vehicle which automatically stops an engine by idle stop execution before a vehicle stop is assumed. At this time, since the time when an engine stops is before a vehicle stop, the number of rotations of the input shaft connected to axles via a transmission mechanism does not stop, and the forward clutch is opened by idle stop execution. Therefore, the number of turbine rotations and the number of input shaft rotations do not coincide with each other. For this reason, since the change behavior of the number of turbine rotations at the time of forward clutch engagement start changes not only in a decreasing direction but in an increasing direction depending on the size relationship between the number of turbine rotations and the number of input shaft rotations differently from first embodiment, learning cannot be executed by the technique of first embodiment. second embodiment aims at enabling electric oil pump driving output learning, even in an idle stop vehicle which automatically stops an engine by idle stop execution before such a vehicle stop.

Hereinafter, second embodiment of the present invention will be described with reference to the drawings. A schematic configuration of a system of a control device for an automatic transmission and a block diagram of the control device which are adopted in second embodiment are the same as those of first embodiment. Similarly to first embodiment, FIG. 4 is a flow chart showing the processing operation of the forward clutch engagement/disengagement determination means 61 at the time of an idle stop and the electric oil pump control means 62 at the time of an idle stop, and, similarly to first embodiment, FIG. 7 is a flow chart showing the processing operation of the electric oil pump driving output control means 65 referred to by FIG. 4.

Here, in second embodiment, the electric oil pump driving output learning condition of Step 105 of FIG. 4 is a case where the electric oil pump driving output learning completion flag satisfies Fop_lrn_end=0, i.e., learning is not completed, and the deviation between the turbine rotation number Nt measured by the turbine rotation number sensor 2 and the input shaft rotation number Nis measured by the input shaft rotation number sensor 3 is equal to or greater than a predetermined value, for example, 200 rpm, and it is determined that this learning control can be executed.

Similarly, the electric oil pump driving output learning completion condition of Step 107 of FIG. 4 is a case where the electric oil pump driving output learning completion flag satisfies Fop_lrn_end=1, i.e., learning is completed, and the deviation between the turbine rotation number Nt measured by the turbine rotation number sensor 2 and the input shaft rotation number Nis measured by the input shaft rotation number sensor 3 is smaller than a predetermined value, for example, 50 rpm, and it is determined that this learning control cannot be executed.

Figure 9:
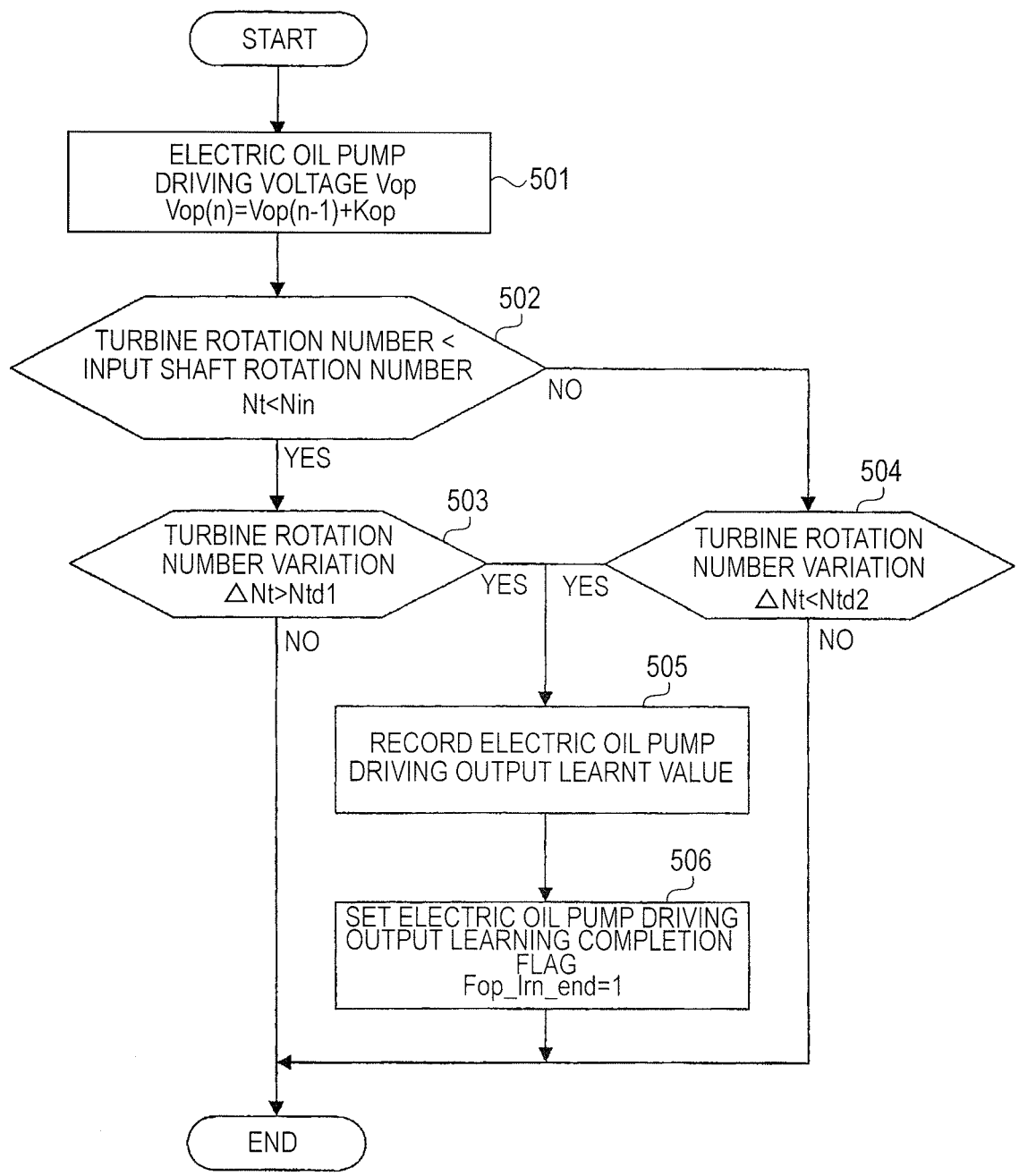
FIG. 9 is a flow chart showing a control operation for executing a learning control of electric oil pump driving output, in a control device for an automatic transmission related to second embodiment of the present invention.

Next, the control operation of the electric oil pump driving output control means 64 at the time of learning executed by the automatic transmission control device 60 is shown in a flow chart of FIG. 9. The electric oil pump driving output control means 64 at the time of learning is called from Step 110 of FIG. 4 similarly to first embodiment, and this calling is repeatedly executed by constant cycle processing (every tens of milliseconds).

Figure 10:
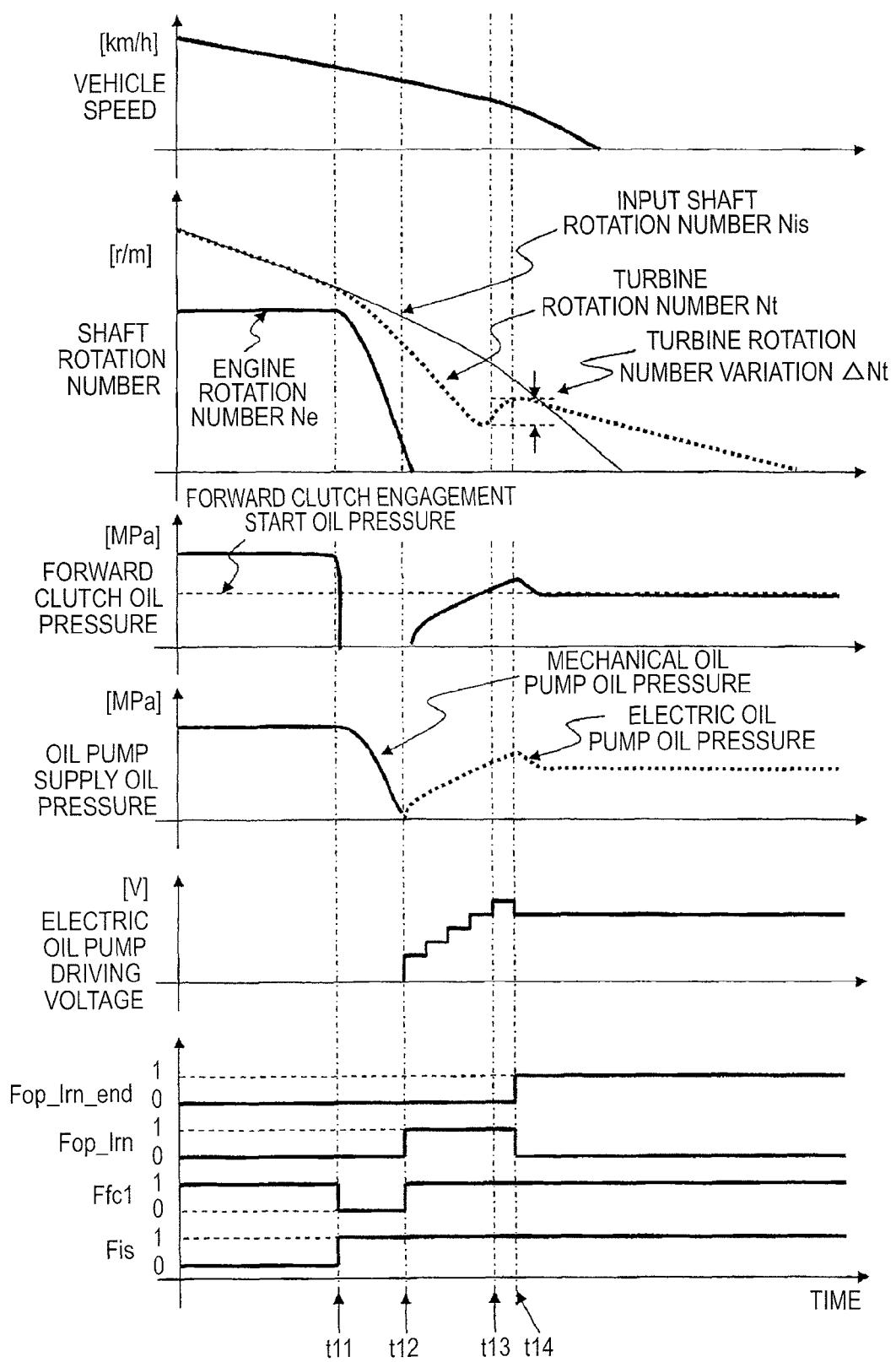
FIG. 10 is a time chart showing the relationship between the number of rotations of each rotary shaft, working oil pressure, and control flags when an electric oil pump driving output learning control has been executed in the case that the number of rotations of an input shaft>the number of turbine rotations, in the control device for the automatic transmission related to second embodiment of the present invention.

FIG. 10 is a time chart showing the relationship between the rotation number of each rotary shaft, working oil pressure, and control flags when the electric oil pump control means 62 during idle stop execution is used in the case that the number of turbine rotations<the input shaft rotation number after idle stop execution, in second embodiment.

Figure 11:
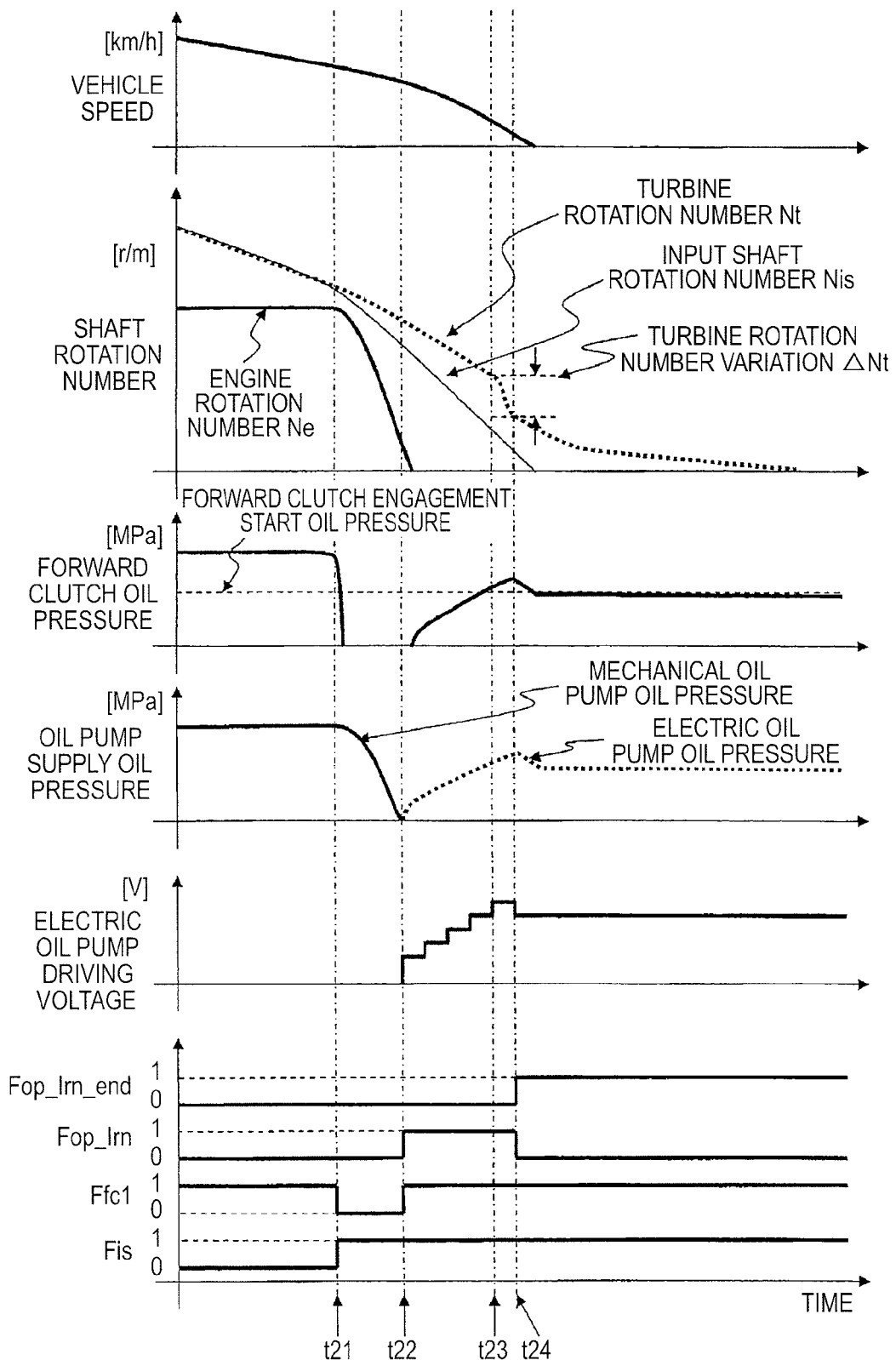
FIG. 11 is a time chart showing the relationship between the number of rotations of each rotary shaft, working oil pressure, and control flags when the electric oil pump driving output learning control has been executed in the case that the number of rotations of the input shaft<the number of rotations of the turbine, in the control device for the automatic transmission related to second embodiment of the present invention.

FIG. 11 is a time chart showing the relationship between the number of rotations of each rotary shaft, working oil pressure, and control flags when the electric oil pump control means 62 during idle stop execution is used in the case that the number of turbine rotations>the input shaft rotation number after idle stop execution, in second embodiment.

The processing operation of the electric oil pump driving output control means 64 at the time of learning will be described with reference to FIG. 9. Here, the operation (to t12 of FIG. 10 and to t22 of FIG. 11) until the electric oil pump driving output learning execution determination means 63 is executed is the same as that of first embodiment.

The automatic transmission control device 60 which is a control means first obtains, in Step 501, a driving voltage Vop which is the driving output of the electric oil pump 40. The driving voltage Vop is calculated using the following expressions.

$$Vop(n)=Vop(n-1)+Kvop \text{ (}n \text{ represents this time and } n-1 \text{ represents the last time)}$$

Here, Kvop to be added to the last driving voltage Vop (n−1) is, for example, 0.5 V. In addition, the initial value of the previous driving voltage Vop (n−1) may be a voltage, for example, 2.5 V at which the working oil pressure is generated in advance by the driving of the electric oil pump, or may be a value obtained by subtracting a predetermined value, for example, 2.0 V from the driving voltage Vop_is at the time of an engine automatic stop during idle stop execution obtained by the electric oil pump driving output learning which was previously executed in order to shorten learning time.

The turbine rotation number Nt is compared with the input shaft rotation number Nis in Step 502. In a case where the turbine rotation number Nt is smaller than the input shaft rotation number Nis (from t12 of FIG. 10), the processing proceeds to Step 503. In a case where the number of turbine rotations is greater (from t22 of FIG. 11), the processing proceeds to Step 504.

The variation ΔNt of the number of turbine rotations is confirmed in Step 503. The variation ΔNt of the number of turbine rotations is calculated from the turbine rotation number Nt and its previous value, similarly to Step 202 of first embodiment. In a case where the variation ΔNt of the number of turbine rotations is greater than the turbine variation determination value Ntd1 (t14 of FIG. 10), it is considered that the condition is satisfied, and the processing proceeds to Step 505. In a case where the condition is not satisfied (t12 to t13 of FIG. 10), this control is ended, and subsequently, monitoring is continued. Here, the turbine variation determination value Ndt1 is the data obtained by an experiment in advance as the value at which it can be clearly confirmed that synchronization has been started with the number of input shaft rotations as the forward clutch 21 starts engagement, for example, set to +20 rpm.

The variation ΔNt of the number of turbine rotations is confirmed in Step 504. In a case where the variation ΔNt of the number of turbine rotations is smaller than the turbine variation determination value Ntd2 (t24 of FIG. 11), it is considered that the condition is satisfied, and the processing proceeds to Step 505. In a case where the condition is not satisfied (t22 to t23 of FIG. 11), this control is ended, and subsequently, monitoring is continued. Here, the turbine variation determination value Ntd2 is the data obtained by an experiment in advance as the value at which it can be clearly confirmed that synchronization has been started with the number of input shaft rotations as the forward clutch 21 starts engagement, for example, set to −50 rpm.

In Step 505, an electric oil pump driving output learnt value is recorded, and the processing proceeds to Step 506. The recording of the electric oil pump driving output learnt value is executed using the recording method of the electric oil pump driving output learnt value of FIG. 6.

In Step 506, the electric oil pump driving output learning completion flag is set to Fop_lrn_end=1, and this control is ended.

Next, the operation of the control device for the automatic transmission related to second embodiment will be described with reference to a timing chart of FIGS. 10 and 11. Here, signals described on the time charts of FIGS. 10 and 11 are the same as those of FIG. 8 of first embodiment.

First, the time chart of FIG. 10 will be described with time. When the vehicle speed decreases, and decreases to a predetermined value or less (t11), the idle stop execution condition is satisfied (Fis=0→1). At this time, the forward clutch oil pressure is reduced by controlling the hydraulic circuit 23 so as to release the forward clutch 21 (Ffcl=1→0). Next, when the engine rotation number Ne decreases (t12) as the fuel supply to the engine is stopped by idle stop execution, the supply of oil pressure by the mechanical oil pump 22 decreases. Therefore, the hydraulic circuit 23 is controlled so that the forward clutch 21 engages (Ffcl=0→1). Additionally, the electric oil pump driving output learning control is started (Fop_lrn=0→1). When the supply of oil pressure is gradually increased by the electric oil pump driving output learning control, as the forward clutch oil pressure reaches the forward clutch engagement start oil pressure, and the forward clutch 21 engages, the turbine rotation number Nt changes in a direction which synchronizes with the input shaft rotation number Nis, i.e., in an increasing direction, (t13). The start of engagement of the forward clutch 21 is determined depending on the size relationship between the turbine rotation number Nt and the input shaft rotation number Nis, and the rotation number variation ΔNt at this time, the previous electric oil pump driving voltage is held as a learnt value, and the electric oil pump driving output learning control is ended (Fop_lrn=1→0). After the electric oil pump driving output learning-control completion (Fop_lrn_end=0→1) (from t14), the learnt value is designated as the electric oil pump driving voltage until the idle stop execution condition is cancelled (Fis=1→0).

Next, the time chart of FIG. 11 will be described with time. When the vehicle speed decreases, and decreases to a predetermined value or less (t21), the idle stop execution condition is satisfied (Fis=0→1). At this time, the forward clutch oil pressure is reduced by controlling the hydraulic circuit 23 so as to release the forward clutch 21 (Ffcl=1→0). Next, when the engine rotation number Ne decreases (t22) as the fuel supply to the engine is stopped by idle stop execution, the supply of oil pressure by the mechanical oil pump 22 decreases. Therefore, the hydraulic circuit 23 is controlled so that the forward clutch 21 engages (Ffcl=0→1). Additionally, the electric oil pump driving output learning control is started (Fop_lrn=0→1). When the supply of oil pressure is gradually increased by the electric oil pump driving output learning control, as the forward clutch oil pressure reaches the forward clutch engagement start oil pressure, and the forward clutch 21 engages, the turbine rotation number Nt changes in a direction which synchronizes with the input shaft rotation number Nis, i.e., in a decreasing direction, (t23). The start of engagement of the forward clutch 21 is determined depending on the size relationship between the turbine rotation number Nt and the input shaft rotation number Nis, and the rotation number variation ΔNt at this time, the previous electric oil pump driving voltage is held as a learnt value, and the electric oil pump driving output learning control is ended (Fop_lrn=1→0). After the electric oil pump driving output learning-control completion (Fop_lrn_end=0→1) (from t24), the learnt value is designated as the electric oil pump driving voltage until the idle stop execution condition is cancelled (Fis=1→0).

As described above, according to the control device for the automatic transmission related to second embodiment of the present invention, even in an idle stop vehicle which stops an engine before a vehicle stop, it becomes possible to gradually increase the driving output of an electric oil pump unit after an engine automatic stop, and determine the state immediately before engagement from the size relationship between the number of input shaft rotations and the number of turbine rotations, and a change in the rotation number of the turbine rotation number. By learning the driving output of the electric oil pump during an engine automatic stop, the working oil pressure supplied by the electric oil pump during an engine automatic stop immediately after an engine automatic stop can be made suitable even if a vehicle is in a stopped state without adding an oil pressure sensor and an oil pressure switch, and a vain increase in power consumption, deterioration of acceleration responsiveness at the time of an engine restart, generation of shock, and soaring of the number of engine rotations can be prevented.

Third Embodiment

In third embodiment, a case where the electric oil pump driving output learning shown in first embodiment and second embodiment cannot be executed is assumed. In a case where the electric oil pump driving output learning cannot be executed, in first embodiment and second embodiment, the learnt value at the time of the completion of previous execution has been used as an electric oil pump driving output. However, since the viscosity of the working oil and the amount of leakage of the working oil pressure differ according to the oil temperature in a case where the temperature of the working oil differs greatly from that at the time of the completion of previous learning, there is a problem that precision is deficient. For this reason, the electric oil pump driving output is intended to be a more precise value even when learning is not completed.

Hereinafter, third embodiment of the present invention will be described with reference to the drawings. A schematic configuration of a system and a block diagram of a control device which are adopted in third embodiment are the same as those of first embodiment. Similarly to first embodiment, FIG. 4 is a flow chart showing the whole processing operation of the forward clutch engagement/disengagement determination means 61 at the time of an idle stop and the electric oil pump control means 62, and, similarly to first embodiment, FIG. 5 is a flowchart showing the processing operation of the electric oil pump driving output control means 64 at the time of learning referred to by FIG. 4.

Figure 12:
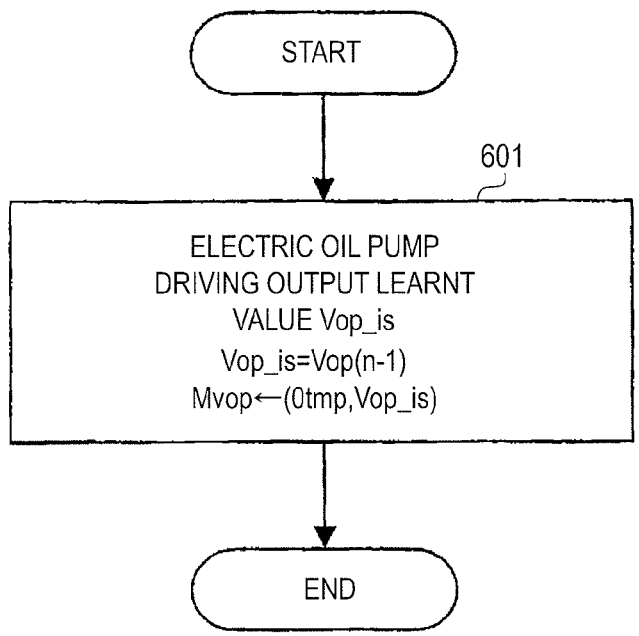
FIG. 12 is a flow chart showing a control operation for executing learning control value storing of electric oil pump driving output, in a control device for an automatic transmission related to third embodiment of the present invention.
Figure 13:
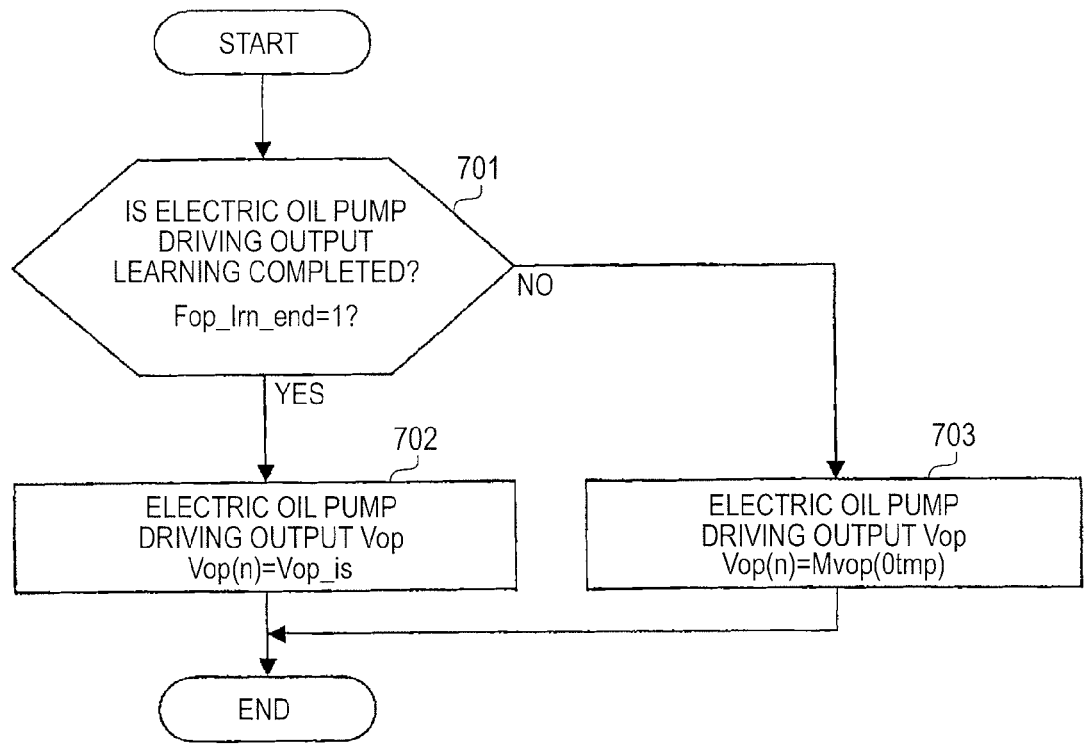
FIG. 13 is a flow chart showing a control operation for executing electric oil pump driving output while a learning control is not executed, in the control device for the automatic transmission related to third embodiment of the present invention.

Next, a recording method of an electric oil pump driving output learnt value referred to by the electric oil pump driving output learning control means 64 at the time of learning executed by the automatic transmission control device 60, and the control operation of the electric oil pump driving output control means 65 are shown in flow charts of FIGS. 12 and 13. The electric oil pump driving output learning control means 64 at the time of learning is called from Step 110 of FIG. 4 similarly to first embodiment, and the electric oil pump driving output control means 65 is called from Step 111 of FIG. 4 similarly to first embodiment, and these callings are repeatedly executed by constant cycle processing (every tens of milliseconds).

Figure 14:
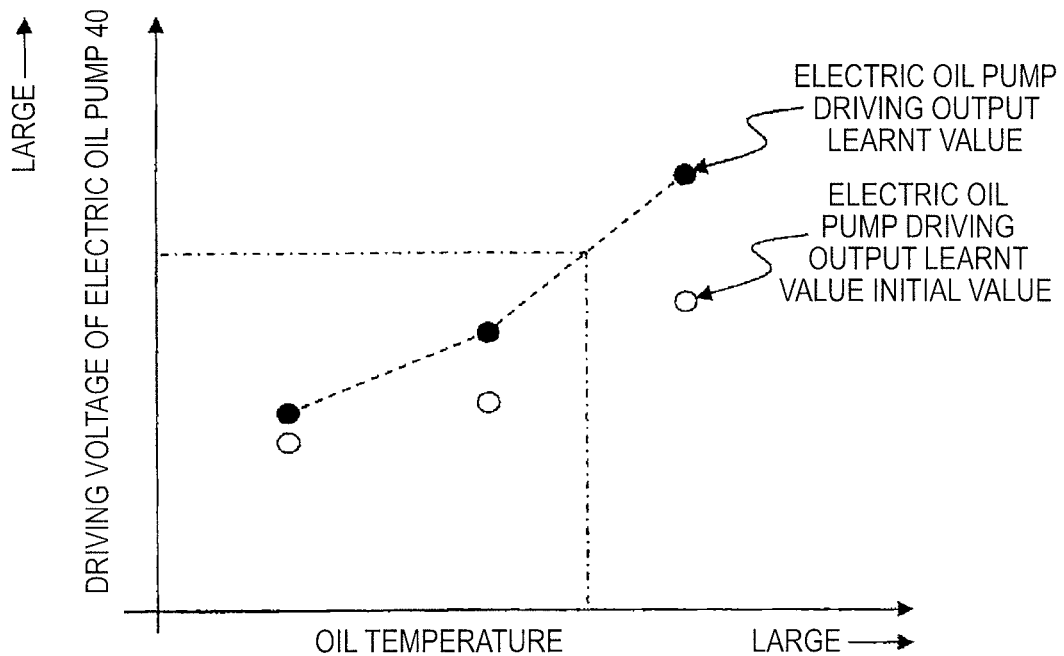
FIG. 14 is a map of working oil temperature and an electric oil pump driving output learnt value in the control device for the automatic transmission related to third embodiment of the present invention.

FIG. 14 is a map prepared from a learnt value and working oil temperature at the time of the completion of the electric oil pump driving output learning in third embodiment.

Figure 15:
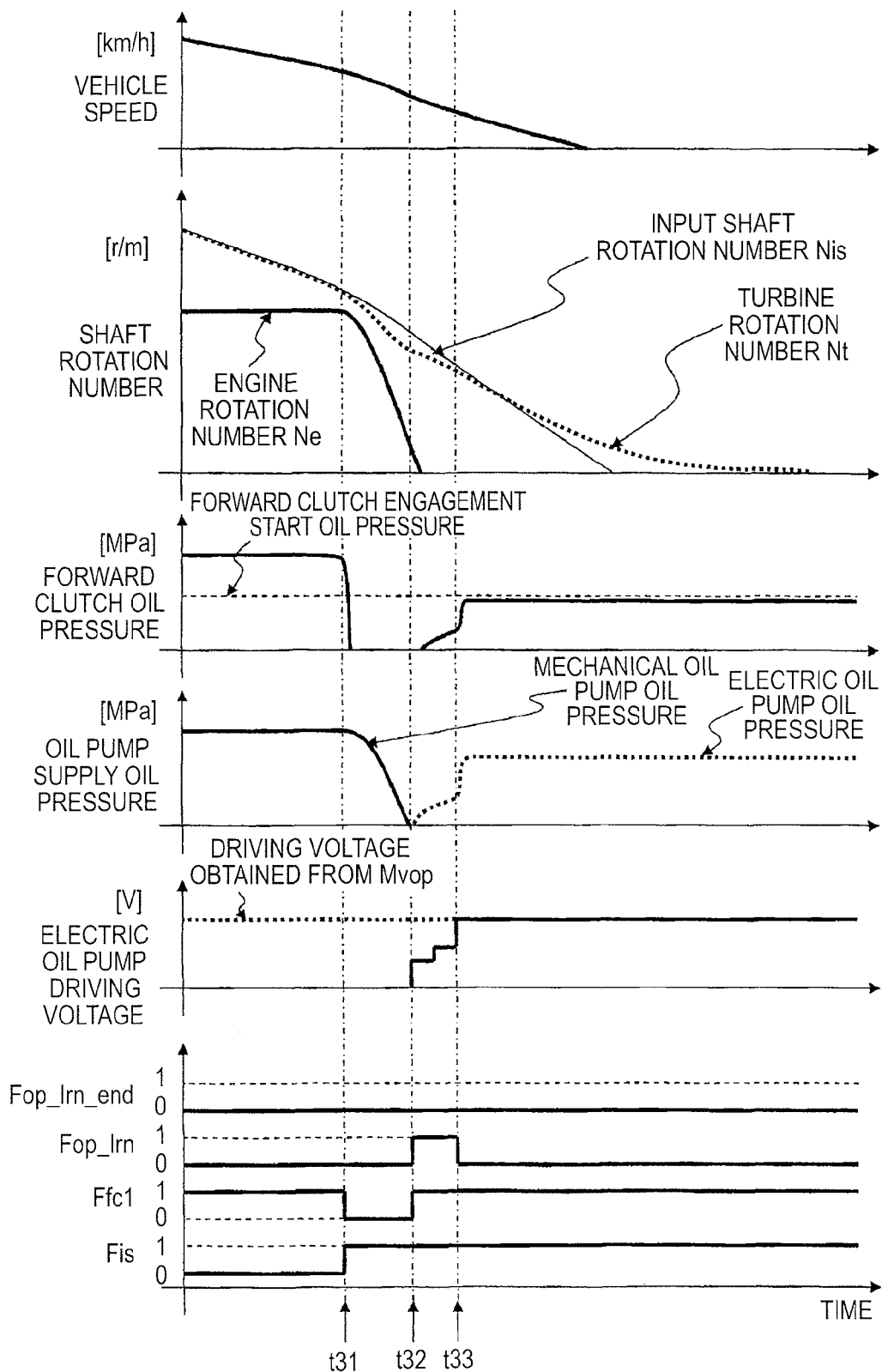
FIG. 15 is a time chart showing the relationship between the number of rotations of each rotary shaft, working oil pressure, and control flags when an electric oil pump driving output learning control has not been completed, in the control device for the automatic transmission related to third embodiment of the present invention.

FIG. 15 is a time chart showing the relationship between the number of rotations of each rotary shaft, working oil pressure, and control flags when the electric oil pump driving output learning cannot be completed using the electric oil pump control means 64 at the time of learning, in third embodiment.

First, the processing operation of the recording method of the electric oil pump driving output learnt value referred to by the electric oil pump driving output learning control means 64 at the time of learning is described with reference to FIG. 12.

Here, the operation until the electric oil pump driving output control means 64 at the time of learning is executed is the same as that of first embodiment.

The automatic transmission control device 60 which is a control means records the driving voltage Vop(n−1) as the electric oil pump driving output learnt value Vop_is in Step 601. With the working oil temperature measured by the oil temperature sensor 51 being defined as Otmp, both the driving voltage Vop_is and the working oil temperature Otmp are stored in a map Mvop, and the electric oil pump driving output learning is completed.

$Vop\_is = Vop(n-1)$ $Mvop \leftarrow (Otmp, Vop\_is)$

Here, an initial value calculated in advance by a vehicle test is set to Mvop, and at the time of the completion of learning, the learnt value of the working oil temperature portion is changed, and the map Mvop is updated.

Next, the processing operation of the electric oil pump driving output control means 64 at the time of learning will be described with reference to FIG. 13.

First, the processing operation until the electric oil pump driving output control means 64 at the time of learning is executed is the same as that of first embodiment. A time chart in a case where the electric oil pump driving output learning is completed (Fop_lrn_end=1), and the electric oil pump driving output learning is canceled (Fop_lrn=0) is FIG. 10 (to t14), and a time chart in a case where the electric oil pump driving output learning is not completed (Fop_lrn_end=0), and the electric oil pump driving output learning is canceled (Fop_lrn=0) is FIG. 15 (to t33).

Next, the automatic transmission control device 60 which is a control means determines in Step 701 whether or not the electric oil pump driving output learning is completed. In a case where the electric oil pump driving output learning completion flag satisfies Fop_lrn_end=1, i.e., the electric oil pump driving output learning is completed (t14 of FIG. 10), the processing proceeds to Step 702. In a case where the electric oil pump driving output learning completion flag satisfies Fop_lrn_end=0, i.e., the electric oil pump driving output learning is not completed (t33 of FIG. 15), the processing proceeds to Step 703.

In Step 702, the electric oil pump driving output learnt value Vop_is is output as the driving voltage Vop, and this control is ended.

$Vop = Vop\_is$

In Step 703, the learnt value map Mvop stored in previous learning, and the working oil temperature measured by the oil temperature sensor 51 are obtained from Otmp, and are output as an electric oil pump driving output Vop.

$Vop = Mvop(Otmp)$

Here, Mvop is a map prepared from the working oil temperature and learnt value at the time of the completion of the electric oil pump driving output learning, in the above-mentioned electric oil pump driving output learning execution determination means 63. For example, as shown in FIG. 14, the driving output of the electric oil pump is obtained from the working oil temperature Otmp.

Next, the operation of the control device for the automatic transmission related to third embodiment will be described with reference to a timing chart of FIG. 15. Here, signals described on the time chart of FIG. 15 are the same as those of FIG. 8 of first embodiment.

The time chart of FIG. 15 will be described with time. When the vehicle speed decreases, and decreases to a predetermined value or less (t11), the idle stop execution condition is satisfied (Fis=0→1). At this time, the forward clutch oil pressure is reduced by controlling the hydraulic circuit 23 so as to open the forward clutch 21 (Ffcl=1→0). Next, when the engine rotation number Ne decreases (t32) as the fuel supply to the engine is stopped by idle stop execution, the supply of oil pressure by the mechanical oil pump 22 decreases. Therefore, the hydraulic circuit 23 is controlled so that the forward clutch 21 engages (Ffcl=0→1). Additionally, the electric oil pump driving output learning control is started (Fop_lrn=0→1). Next, when the input shaft rotation number Nis changes according to deceleration of a vehicle, and the deviation from the turbine rotation number Nt becomes small, the electric oil pump driving output learning control cannot be executed. Therefore, the electric oil pump driving output learning control is ended (Fop_lrn=1→0) (t33). In a case where the electric oil pump driving output learning control is not completed (Fop_lrn_end=0), and the electric oil pump driving output learning control is ended (Fop_lrn=0), the electric oil pump driving voltage is determined on the basis of the map Mvop updated at the time of previous learning and the working oil temperature measured by the oil temperature sensor 5, and the electric oil pump driving voltage is designated until the idle stop execution condition is canceled (Fis=1→0).

As described above, according to the control device for the automatic transmission related to the embodiment 3 of the present invention, the learning means which learns the driving output of the electric oil pump simultaneously records a learnt value and working oil temperature at that time in a case where learning can be executed. Even in a case where the electric oil pump driving output learning cannot be executed by an electric oil pump driving output learning means, it becomes possible to obtain an electric oil pump driving output on the basis of a driving output which was previously learnt, and the working oil temperature which is simultaneously recorded and current working oil temperature. Thereby, the working oil pressure to be supplied by the electric oil pump during an engine automatic stop can be made suitable, and a vain increase in power consumption, deterioration of acceleration responsiveness at the time of an engine restart, generation of shock, and soaring of the number of engine rotations can be prevented.

Various modifications and alterations of this invention will be apparent to those skilled in the art without departing from the scope and spirit of this invention, and it should be understood that this is not limited to the illustrative embodiments set forth herein.

What is claimed is:

1. A control device for an automatic transmission having an automatic transmission which receives working oil pressure to perform shift operation, comprising:
 a mechanical oil pump driven by an engine to supply the working oil pressure for control of the shift operation to the automatic transmission;
 an electric oil pump driven by an electric motor to supply the working oil pressure for control of the shift operation to the automatic transmission, in which the working oil pressure generated by the electric oil pump is supplied to the automatic transmission when the engine automatically stops after a vehicle stop; and
 automatic transmission control element configured to learn the driving output of the electric oil pump when a forward clutch is brought into a state immediately before engagement by gradually increasing the output of the electric oil pump after an engine automatic stop when the working oil pressure generated by the electric oil pump is supplied to the forward clutch engaged at a shift stage at the time of the vehicle stop, and by discriminating the engagement state of the forward clutch on the basis of the behavior of the turbine rotation number of the automatic transmission.

2. The control device for an automatic transmission according to claim 1,
 wherein the behavior of the turbine rotation number is the rotation number variation of the turbine rotation number.

3. The control device for an automatic transmission according to claim 1,
 wherein the automatic transmission control element is further configured to simultaneously record a working oil temperature at the time of learning execution, and determine the driving output of the electric oil pump on the basis of the electric oil pump driving output learnt value which was previously learnt, and the working oil temperature which is simultaneously recorded and current working oil temperature, in a case where the driving output learning of the electric oil pump cannot be executed by the automatic transmission control element.

4. A control device for an automatic transmission having an automatic transmission which receives working oil pressure to perform shift operation, comprising:
 a mechanical oil pump driven by an engine to supply the working oil pressure for control of the shift operation to the automatic transmission;
 an electric oil pump driven by an electric motor to supply the working oil pressure for control of the shift operation to the automatic transmission, in which the working oil pressure generated by the electric oil pump is supplied to the automatic transmission when the engine automatically stops before a vehicle stop; and
 automatic transmission control element configured to learn the driving output of the electric oil pump when a forward clutch is brought into a state immediately before engagement by gradually increasing the output of the electric oil pump after an engine automatic stop when the working oil pressure generated by the electric oil pump is supplied to the forward clutch engaged at a shift stage at the time of the vehicle stop, and by discriminating the engagement state of the forward clutch on the basis of the behavior of the turbine rotation number of the automatic transmission and the input shaft rotation number of the automatic transmission.

5. The control device for an automatic transmission according to claim 4,
 wherein the behavior of the turbine rotation number and input shaft rotation number is the rotation number variation of the turbine rotation number, and the input shaft rotation number.

* * * * *